March 26, 1935.  A. DE L. SINDEN  1,995,589
CONVEYER
Filed Nov. 22, 1933  2 Sheets-Sheet 1
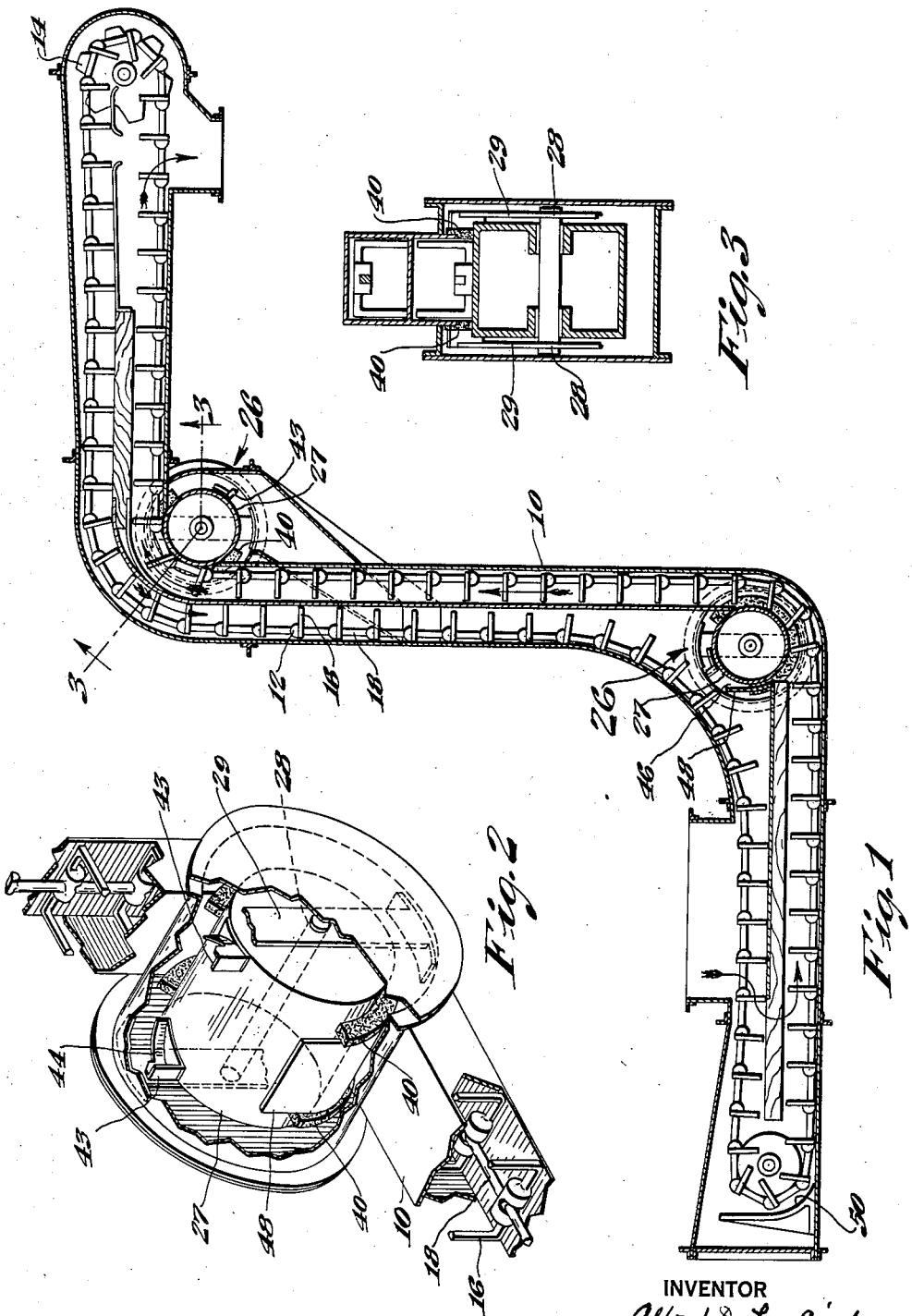
INVENTOR
Alfred De Los Sinden
BY J. Stanley Churchill
ATTORNEY

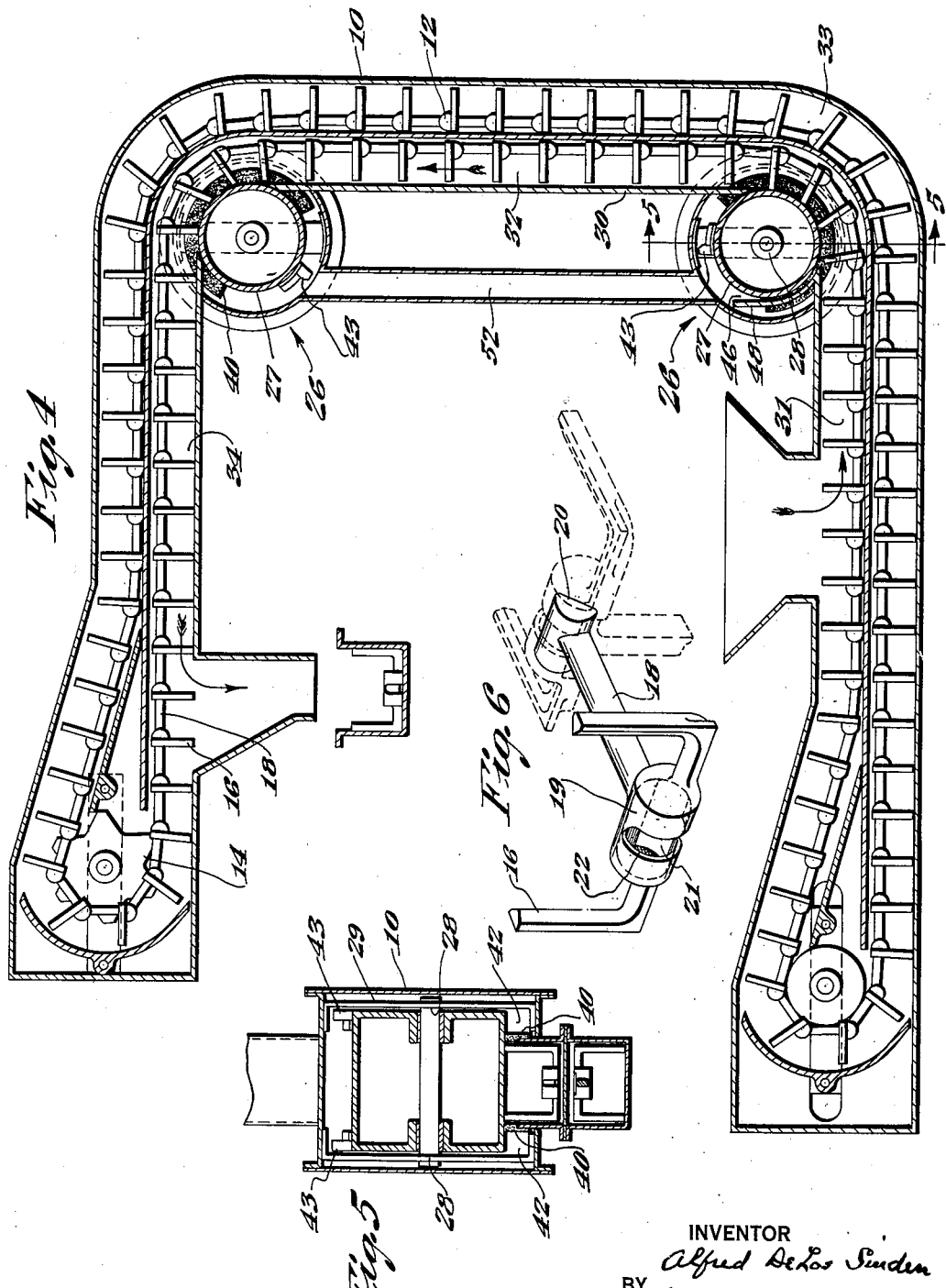

Patented Mar. 26, 1935

1,995,589

UNITED STATES PATENT OFFICE 1,995,589

CONVEYER

Alfred De Los Sinden, Aurora, Ill., assignor to Redler Conveyor Company, Quincy, Mass., a corporation of Massachusetts Application November 22, 1933, Serial No. 699,180

2 Claims. (Cl. 198—168)

This invention relates to a conveyer, and more particularly to a conveyer of the type disclosed in the Redler Reissue Patent No. 18,445, April 26, 1932.

One object of the invention is to provide a conveyer of the character specified in which the conduit or casing is constructed to provide two connected sections angularly arranged with respect to one another, so that as the transporting member and the material are drawn through the casing they are caused to pass around a corner, and in which provision is made for facilitating the passage of the transporting member and the material through the casing and around the corner whereby conveyance of the material may be effected with minimum power and at minimum expense and with minimum liability of breakage and congestion.

A further and more specific object of the invention is to provide a novel conveyer of the character specified embodying a novel rotatable device for facilitating the drawing of the transporting member around the corners in the casing, for reducing to a minimum the leakage of the material past the rotatable device and for automatically returning any material which does leak to the stream of material being conveyed.

Another object of the invention is to provide a novel and improved conveyer of the character specified in which provision is made for enabling the transporting member to be drawn successfully around a corner close to the driving end of the conveyer where the tension in the moving element is approaching a maximum.

Another object of the invention is to provide a novel and improved conveyer of the character specified in which the casing is so disposed as to provide at least three succeeding and connected portions angularly arranged with respect to each other and through which the transporting element and the load may be successfully drawn with minimum power.

With these objects in view and such others as may hereinafter appear, the invention consists in the conveyer and in the various structures, arrangements and combinations of parts hereinafter described and particularly defined in the claims at the end of this specification.

In the drawings illustrating the preferred embodiments of the invention, Fig. 1 is a vertical sectional view through a complete conveyer embodying the invention; Fig. 2 is a perspective with portions broken away to illustrate the drum turning device; Fig. 3 is a sectional detail taken on the line 3—3 of Fig. 1; Fig. 4 is another vertical sectional view illustrating a modified form of conveyer and the arrangement for preventing the leakage of the material at the corners around which the transporting element is drawn; Fig. 5 is a sectional detail on the line 5—5 of Fig. 4; and Fig. 6 is a detail of one of the conveyer flights.

Difficulty has heretofore been experienced in the commercial use of the conveyers shown in the Redler reissue patent above referred to in turning corners in some instances where the tension on the transporting member has been considerable. The friction of the transporting member against the conveyer casing as it was drawn around the curve or corner is oftentimes sufficient to cause abrasion and in some instances breakage of the transporting element. The abrasive effect produced severely wears the curved section of the conveyer casing and the effect is particularly objectionable in the use of the conveyer for the transportation of food products where metallic particles are dangerous. The effect is also particularly objectionable in the conveyance of dusty materials such as starch because of the danger of explosion.

In one aspect, the invention therefore contemplates the provision of a conveyer of the character specified in which the objections heretofore encountered are eliminated, preferably by the provision of an anti-friction device or means for cooperation with the transporting member to enable the transporting member to be drawn around a corner with minimum friction. In the preferred form of the invention a rotatable drum is arranged to form a portion of the conveyer casing at the corner to be turned, and during the operation of the conveyer the transporting member and the load contact the rotatable drum and move with it around the corner. Provision is also made for reducing to a minimum leakage at the corner being turned and for returning automatically any material which does leak, back into the stream of material being transported.

Referring to the drawings, the conveyer in general comprises a conveyer of the type forming the subject matter of the Redler reissue patent above referred to, which is characterized by its ability to convey the flowable solid material in a continuous stream, and includes a casing 10 through which a transporting member indicated generally at 12 is arranged to be drawn as by a suitable driving sprocket 14 rotated from a source of power, not shown. The transporting member 12 is provided with a plurality of spaced open flights 16 connected together in such manner as to be capable of movement around the corner, and the individual flights may be of various skeleton form and configuration depending upon the character of the material, the form of casing, and other considerations, as illustrated in said Redler reissue patent.

As illustrated herein, the flights 16 comprise units which are of U-shape and arranged to be detachably connected together by rigid connecting members 18, in such manner as to permit pivotal movement of one with respect to another during the normal movement of the transporting member around the corners between adjacent angularly disposed portions of the conveyer casing.

As herein shown, each conveyer flight comprises a preformed open structure comprising a rigid connecting member 18 having at one end a hollow hub 19 and at the other end an enlargement 20 capable of being received within the hollow hub of a succeeding flight to pivotally connect the units together. The hollow hub 19 of each unit may be provided with a tranversely extended opening 21 of a width with respect to the enlargement 20 such as to permit detachment of the units only upon relative movement thereof into an abnormal position, such as is illustrated in dotted lines in Fig. 6, whereupon the enlargement may be withdrawn from within the hollow hub through the transversely extended opening 21. The hollow hub of each unit is further provided with an additional slot or opening 22 designed to permit movement of the connecting member 18 of a succeeding unit during pivotal movement of the units.

As above stated, difficulty has been encountered in conveyers of the type above referred to in turning the corners when tension upon the transporting member has been considerable, and in accordance with the present invention the conveyer casing 10 is provided with an anti-friction device 26 in a position to cooperate with the transporting member 12 as the latter is carrying the load of material around one or more corners of the casing. In the preferred form of the invention, a rotatable drum 27 is journalled in bearings 28 in brackets 29 suitably mounted in a position such that the periphery of the drum forms a continuation of, or a part of the wall of the casing 10 at the corner therein, around which the load bearing run of the conveyer is drawn.

In Fig. 4 I have illustrated more or less diagrammatically a practical embodiment of the present invention in which the conveyer casing is disposed so as to provide an initial horizontal run 31 and a vertical run 32 connected by a right angle corner 33. The vertical run 32 is connected by a second right angle corner to a succeeding horizontal run 34 located at an elevation above the initial horizontal run. In some instances the upper horizontal run 34 may turn back in the same direction as the initial lower horizontal run, as illustrated in Fig. 4, and in other instances it may turn in the general direction shown in Fig. 1, and in all cases I prefer to interpose the anti-friction device 26 at the corners around which the carrying run of the transporting member passes, so that in passing around the corner the individual flights of the transporting member are supported upon and turn with the rotatable drum with minimum friction, and as a result the difficulties heretofore experienced are as above stated in practice eliminated. The commercial limitations which have heretofore been placed upon conveyers of this type may be illustrated by reference to the fact that in installations where it was necessary to utilize a horizontal run and then turn a corner into a vertical run, forty feet represented the maximum permissible length of the horizontal run which could be used and successfully turn the corner into the vertical run with materials of average commercial density such as cocoa, starch, coffee and salt. With heavier materials the permissible distance has been less. It will therefore be apparent that very definite commercial limitations have been placed upon the utility of this type of conveyer for certain purposes, and by the present invention the range and field of use of the conveyer is greatly increased.

As illustrated in Figs. 2, 3 and 5, I have illustrated mechanism which cooperates with the rotatable drum 27 to reduce to a minimum leakage of the flowable solid material between the drum 27 and the casing 10 and also to return any material which does leak back into the stream of material being conveyed through the casing 10. For freely flowing and non-sticky material I prefer to provide sealing strips 40, preferably of wood or fiber, for substantially closing the gap between the casing 10 and the periphery of the drum 27, and the latter is preferably made wider than the casing, as illustrated, forming pockets 42, see Fig. 5, into which any material leaking by the sealing strips may pass. Provision is made for returning any material which accumulates in the pockets 42 back into the stream of material being conveyed through the casing 10, and for this purpose the drum is provided with veins or lugs 43 formed as illustrated in detail in Fig. 2, and having inwardly inclined surfaces 44, and which function to pick up the material accumulating in the pockets 42, and as the drum continues to turn to direct the fall of such material inwardly toward the center of the drum from each edge portion, causing the material to pass down into the hopper-like space 46 formed between the upstanding portion 48 of the wall of the casing 10 and the rear of the drum 27, and this space opens freely into the stream of material being conveyed within the casing 10, thus effecting the return of the material thereto. During operation of the conveyer, a head of material stands in the hopper-like space 46, and the upward pressure exerted by the material being conveyed is balanced by the weight of this head of material, so that as additional material is deposited in the manner above described into the space 46, a corresponding amount of material is forced out at the bottom and into the moving stream of material being conveyed.

When the periphery of the drum 27 is positioned below the carrying run of the transporting member, as illustrated in Fig. 1, at the upper part thereof, the material which may leak by the sealing strips 40 is returned to the stream by being directed downwardly into the return run of the conveyer.

For sticky materials I prefer to employ a device illustrated in Fig. 4 wherein the drum casing is connected by a return duct 52, by which the material which may have leaked by the sealing strips 40 is returned by gravity to within the casing of the lower anti-friction device, preferably in a position such that it may readily fall into the hopper-like space 46 and be returned into the stream in the manner above described.

While the preferred embodiments of the present invention have been herein illustrated and described, it will be understood that the invention may be embodied in other forms within the scope of the following claims.

Having thus described the invention, what is claimed is:—

1. In a conveyer for conveying flowable solid material in a continuous stream, in combination, a casing, a transporting member provided with a plurality of open flights adapted to cooperate with the casing to effect the transportation of the material in a continuous stream, said casing having two connected portions angularly arranged with respect to one another, an anti-friction device disposed as a part of said casing and cooperating with the transporting member during its movement to diminish the frictional engagement with the casing as the transporting member passes from one to the other of said conected angularly arranged portions, and means for returning to the stream of material being conveyed such material as may leak past the anti-friction device.

2. In a conveyer for conveying flowable solid material in a continuous stream, in combination, a casing, a transporting member provided with a plurality of open flights adapted to cooperate with the casing to effect the transportation of the material in a continuous stream, said casing having two connected portions angulary arranged with respect to one another, an anti-friction device disposed as a part of said casing and cooperating with the transporting member to diminish the frictional engagement thereof with the casing during movement of the transporting member between said connected portions of the casing, said anti-friction device comprising a drum, a closure therefor, sealing members cooperating with the drum, and means upon the drum for picking up and returning to the stream of material being conveyed any material which may leak past said sealing members.

ALFRED DE LOS SINDEN.